United States Patent Office 3,126,392
Patented Mar. 24, 1964

3,126,392
ESTERS OF NORTROPANE AND NORGRANATANE COMPOUNDS, AND PROCESS OF MAKING SAME
Otto Dold, Lampertheim, Hesse, Kurt Stach, Mannheim, and Wolfgang Schaumann, Mannheim-Waldhof, Germany, assignors to C. F. Boehringer & Soehne G.m.b.H., Mannheim-Waldhof, Germany, a company of Germany
No Drawing. Filed Nov. 24, 1961, Ser. No. 154,876
Claims priority, application Germany Nov. 26, 1960
7 Claims. (Cl. 260—292)

The present invention relates to new and valuable esters of nortropane or, respectively, norganatane compounds and more particularly to esters of N-(hydroxy alkyl) nortropanes or, respectively, norgranatanes and to a process of making same.

It is one object of the present invention to provide new and valuable esters of N-(hydroxy alkyl) nortropanes or, respectively, norgranatanes which esters have noteworthy and valuable anticholinergic properties.

Another object of the present invention is to provide a simple and effective process of producing such esters of N-(hydroxy alkyl) nortropanes or, respectively, norgranatanes.

Other objects of the present invention and advantageous features thereof will become apparent as the description proceeds.

In principle the esters according to the present invention correspond to Formula I:

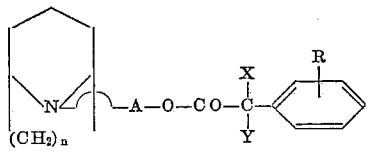

In said formula

R indicates hydrogen, halogen, especially chlorine or bromine; or alkyl, especially lower alkyl; alkoxy, especially lower alkoxy; alkyl mercapto, especially lower alkyl mercapto; or trifluoro methyl;

Y indicates phenyl or cycloalkyl, especially cyclopentyl and cyclohexyl; which may be substituted by halogen, especially chlorine and bromine; alkyl, especially lower alkyl; alkoxy, especially lower alkoxy; alkyl mercapto, especially lower alkyl mercapto; or trifluoromethyl;

X indicates hydrogen, hydroxyl, or halogen, especially chlorine and bromine;

A indicates a straight-chain or branched alkyl with at least two carbon atoms, especially lower alkyl, such as ethylene, propylene, and isopropylene; and n indicates the numerals 2 or 3.

These esters are prepared by methods as they are known to the art. A preferred process consists in reacting N-(hydroxy alkyl) nortropane or, respectively, norgranatane of Formula II

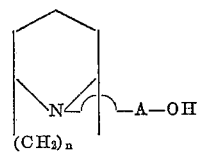

with the halogenide or a lower alkyl ester of a substituted phenyl acetic acid of Formula III

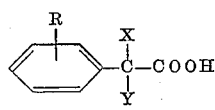

Esterification is preferably effected while heating and basic catalysts may be added.

According to another embodiment of the present invention, the corresponding N-(halogeno alkyl) nortropanes or, respectively, norgranatanes of Formula IV

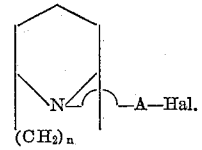

are reacted with the free substituted phenyl acetic acid of Formula III or its alkali metal salts.

It is also possible first to produce the new esters of Formula I wherein X is the hydroxyl group and subsequently converting the hydroxyl group into halogen by halogenation.

The N-(halogeno alkyl) nortropanes or, respectively, norgranatanes used as starting materials in the above mentioned second method of preparing the new esters are obtained by halogenating the corresponding N-(hydroxy alkyl) compounds with inorganic acid chlorides such as thionylchloride, phosphorus tribromide and the like. Thereby, however, not only the desired N-(halogeno alkyl) nortropanes or, respectively, norgranatanes are formed but also the isomeric N-spiro compounds of Formula V:

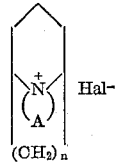

Surprisingly, it has been found that such quaternary N,N-alkylene compounds can also be converted into the corresponding esters of N-(hydroxy alkyl) nortropanes or, respectively, norgranatanes of Formula I by reaction with the substituted phenyl acetic acids of Formula III.

The N-(hydroxy alkyl) norgranatanes and nortropanes are preferably prepared by subjecting the corresponding N-(hydroxy alkyl) norpseudopelletierines or, respectively, nortropinones to the Wolff-Kishner reduction process. Said norpseudopelletierines or, respectively, nortropinones are readily obtained from amines of Formula VI

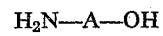

$H_2N—A—OH$                  VI acetone dicarboxylic acid, and glutardialdehyde or, respectively, succindialdehyde by way of the Robinson-Schoepf alkaloid synthesis.

The new esters of N-(hydroxy alkyl) nortropanes or, respectively, norgranatanes of Formula I can be converted into their acid addition salts preferably with pharmaceutically acceptable acids, such as their hydrochlorides, or into their quaternary ammonium compounds.

The following examples serve to illustrate the present invention without, however, limiting the same thereto:

EXAMPLE 1

*Benzilic Acid Ester of N-(β-Hydroxy Ethyl) Norgranatane*

METHOD A (a) 200 g. of an aqueous 25% solution of glutardialdehyde are mixed with a solution of 73 g. of acetone dicarboxylic acid, 30.5 g. of ethanolamine, and 28.2 g. of sodium acetate trihydrate in 1250 cc. of water. The mixture is adjusted to a pH value of 3.0 by the addition of concentrated hydrochloric acid and is allowed to stand at room temperature for three days. Thereafter, the reaction mixture is heated on the water bath for two hours, rendered alkaline by the addition of concentrated sodium hydroxide solution, and repeatedly extracted by means of chloroform. The extract is dried over sodium sulfate and concentrated by evaporation. The residue is distilled. 48.1 g. of N-(β-hydroxyl ethyl) norpseudopelletierine of the boiling point 160–163° C./0.3 mm. Hg are obtained. The yield is 52.5% of the theoretical yield. The resulting base solidifies and melts at 45° C. after recrystallization from petroleum ether. Its hydrochloride has a melting point of 225° C., after recrystallization from a mixture of dioxane and ethanol.

(b) 73.4 g. (0.4 moles) of N-(β-hydroxy ethyl) norpseudopelletierine are slowly heated to 250° C. with 88 g. of 85% hydrazine hydrate, 80 g. of potassium hydroxide, and 500 cc. of triglycol while stirring continuously. Thereby, the volatile components are distilled off in a vacuum of 15 mm. Hg. On distilling the reaction mixture in a high vacuum, 46.6 g. of N-(β-hydroxy ethyl) norgranatane of the boiling point 110–120° C./0.2 mm. Hg are obtained. Yield: 69.1% of the theoretical yield. The compound solidifies and melts at 44–46° C. on recrystallization from petroleum ether. Its hydrochloride melts at 205–207° C. (on recrystallization from isopropanol).

(c) 33.9 g. of N-(β-hydroxyl ethyl) norgranatane and 48.4 g. of benzilic acid methyl ester are heated with 0.5 g. of metallic sodium in a vacuum of about 30 mm. Hg at 80° C. for 3 hours and at 130° C. for 7 hours. Thereby, the escaping, readily volatile compounds, i.e. methanol, are removed. A small amount of 6 N hydrochloric acid is added to the reaction mixture. On addition of ether and shaking, the hydrochloride of the N-(β-hydroxy ethyl) norgranatane benzilic acid ester precipitates in crystalline form. 64.3 g. of said hydrochloride are obtained. Its melting point, after recrystallization from isopropanol, is 201–203° C.

METHOD B (a) 25.4 g. of N-(β-hydroxy ethyl) norgranatane are dissolved in 60 cc. of benzene. 19.5 g. of thionylchloride in 30 cc. of benzene are added thereto while cooling with ice. The reaction mixture is heated under reflux for 30 minutes and is then allowed to cool. The precipitated hydrochloride of N-(β-chloro ethyl) norgranatane is filtered off by suction. On recrystallization from ispropanol 23 g. of its hydrochloride of the melting point 237–238° C. are obtained. Yield: 80.5% of the theoretical yield.

(b) 22.4 g. of N-(β-chloro ethyl) norgranatane, 27.4 g. of benzilic acid, and 13.8 g. of potassium carbonate are heated to 140° C. in a vacuum of 12 mm. Hg for 3 hours. The reaction mixture is then extracted with hot ethanol. The insoluble residue is filtered off and the filtrate is concentrated by evaporation. The residue is boiled with 2 N hydrochloric acid, extracted with ether in order to remove neutral compounds; the aqueous solution is rendered alkaline by the addition of sodium hydroxide solution and is extracted with ether. On evaporating the ether from the ethereal solution, 8 g. of the N-(β-hydroxyl ethyl) granatane benzilic acid ester are obtained as a liquid crude product. The yield is 21.1% of the theoretical yield. On treating said crude product with an ethereal solution of hydrochloric acid, the hydrochloride of the melting point 201–202° C. is obtained, which is identical with the hydrochloride obtained according to Method A.

EXAMPLE 2

Benzilic Acid Ester of N-(γ-Hydroxy Propyl)-Norgranatane

METHOD A (a) 200 g. of an aqueous 25% glutardialdehyde solution, 37.5 g. of γ-hydroxy propylamine, 73 g. of acetone dicarboxylic acid, and 28.2 g. of sodium acetate trihydrate are dissolved in 1250 cc. of water. The reaction mixture is worked up as described hereinabove in Example 1A(a). 69.3 g. of N-(γ-hydroxy propyl) norpseudopelletierine of the boiling point 153–158° C./0.2 mm. Hg are obtained thereby. Yield: 70.2% of the theoretical yield. The compound solidifies and melts, after recrystallization from petroleum ether, at 57–59° C.; its hydrochloride melts at 197–199° C., after recrystallization from isopropanol.

(b) 39.5 g. (0.2 moles) of N-(γ-hydroxy propyl) norpseudopelletierine are slowly heated to 250° C. with 44 g. of 85% hydrazine hydrate, 40 g. of potassium hydroxide, and 250 cc. of triglycol while stirring continuously. Thereby, readily volatile compounds, mainly water, are distilled off. After cooling, 200 cc. of water are added and the aqueous mixture is extracted three times with chloroform, each time with 200 cc. The extract is dried over sodium sulfate and is concentrated by evaporation. The residue is distilled. 26.6 g. of N-(γ-hydroxy propyl) norgranatane of the boiling point 100–110° C./0.2 mm. Hg are obtained. Yield: 73.5% of the theoretical yield. The compound solidifies on cooling but melts below 20° C. The hydrochloride melts at about 160–162° C. on recrystallization from dioxane with the addition of ethanol.

(c) 18.3 g. of N-(γ-hydroxy propyl) norgranatane and 36.3 g. of benzilic acid methyl ester are heated with 0.3 g. of metallic sodium at 130° C. for 10 hours. The methanol split off thereby is removed by operating in a vacuum of about 15 mm. Hg. The reaction mixture is allowed to cool and is shaken with dilute hydrochloric acid and ether until complete solution is achieved. The ethereal extract is discarded. The hydrochloric acid solution is rendered alkaline by the addition of aqueous ammonia solution and is extracted with ether. The ether extract is dried over sodium sulfate, and is concentrated by evaporation to remove the ether. The residue is distilled. 23.4 g. of the N-(β-hydroxy propyl) norgranatane benzilic acid ester of the boiling point 227–250° C./0.6 mm. Hg are obtained. Yield: 59.4% of the theoretical yield. Its hydrochloride melts at 184–185° C. on recrystallization from isopropanol.

METHOD B (a) 45.4 g. of N-(γ-hydroxy propyl) norgranatane are dissolved in 110 cc. of anhydrous benzene. A solution of 35 g. of thionylchloride in 55 cc. of benzene are added thereto at 5–10° C. within 30 minutes while stirring. Thereafter the mixture is heated under reflux for one hour. After cooling, the precipitated compound is filtered off by suction, washed with ether, and dried. 44.8 g. of the hydrochloride of N-(γ-chloro propyl) norgranatane are obtained thereby. The yield is 76% of the theoretical yield. The salt melts at 224–225° C. on recrystallization from isopropanol. In order to prepare the free base the salt is dissolved in water, the aqueous solution is rendered alkaline by the addition of sodium hydroxide solution, and is extracted with ether. On evaporating to dryness the dried ether extract and distilling the evaporation residue, N-(γ-chloro propyl) norgranatane of the boiling point 139–142° C./16 mm. Hg are obtained.

(b) 23.8 g. of N-(γ-chloro propyl) norgranatane are heated with 22.8 g. of benzilic acid and 13.8 g. of potassium carbonate in a vacuum of 12 mm. of Hg to 135–140° C. for 2 hours. After cooling, the mixture is boiled with ethanol, the undissolved salts are filtered off, and the filtrate is concentrated by evaporation. The residue is boiled with dilute hydrochloric acid, the hydrochloric acid solution is extracted with ether in order to remove neutral compounds, is rendered alkaline by the addition of sodium hydroxide solution, and is again extracted with ether. The ether extract is dried over sodium sulfate and is concentrated by evaporation. 5 g. of the N-(γ-hydroxy propyl) norgranatane benzilic acid ester are obtained thereby. Yield: 12.7% of the theoretical yield. The free base melts at 91–91.5° C. on recrystallization from petroleum ether. The hydrochloride obtained therefrom has a melting point of 184–185° C. It is identical with the hydrochloride obtained according to Method A(c).

METHOD C (a) 47 g. of phosphorus tribromide are slowly added drop by drop to 14.2 g. of N-(γ-hydroxy propyl) norgranatane in 80 cc. of chloroform while cooling with ice. The mixture is heated under reflux for one hour. After cooling, excess water is slowly added thereto and, thereafter, sodium hydroxide solution until the aqueous solution has become weakly alkaline. The mixture is then extracted with chloroform. On evaporating the chloroform extract, 14.7 g. of solid N,N-trimethylene norgranatanium bromide are obtained. Yield: 77.0% of the theoretical yield. Said quaternary ammonium compound melts at 242° C. with decomposition, after recrystallization from isopropanol.

(b) 10.5 g. of N,N-trimethylene norgranatanium bromide and 10 g. of benzilic acid are heated under reflux in 100 cc. of ethanol for 3 hours. Thereafter, the ethanol is distilled off and the solidified vitreous mass is caused to crystallize by triturating with acetone. The crystals are filtered off and are washed with acetone. 16.2 g. of the N-(γ-hydroxy propyl) norgranatane benzilic acid ester are obtained in the form of its hydrobromide. The salt melts at 173–175° C. on recrystallization from isopropanol.

EXAMPLE 3

*Benzilic Acid Ester of N-(β-Hydroxy Ethyl) Nortropane*

(a) 52.7 g. of 2,5-diethoxy tetrahydrofuran are heated with 600 cc. of 0.1 N hydrochloric acid at 75° C. for 30 minutes while stirring. The resulting hydrolysate is added to a solution of 45 g. of acetone dicarboxylic acid, 19 g. of ethanolamine, and 100 g. of sodium acetate trihydrate in one liter of water. The mixture is allowed to stand at room temperature for 3 days. Its pH value is then adjusted to a pH of about 4.0 by the addition of 6 N hydrochloric acid. The resulting mixture is heated to 90° C. for one hour. It is then rendered alkaline by the addition of sodium hydroxide solution, extracted with chloroform; the extract is dried, evaporated to dryness, and the residue is distilled. 23.7 g. of N-(β-hydroxy ethyl)nortropinone-(3) boiling at 130–135° C./0.2 mm. Hg are obtained. Yield: 42.7% of the theoretical yield.

(b) 67 g. of N-(β-hydroxy ethyl) nortropinone-(3- are heated with 80 cc. of hydrazine hydrate, 8 cc. of water, 80 g. of potassium hydroxide, and 500 cc. of triglycol to 250° C. while stirring. Thereby, readily volatile compounds are simultaneously distilled off by means of a descending condenser. Water is added to the residue and the mixture is extracted with chloroform. The chloroform extract is washed with water, dried over sodium sulfate concentrated by evaporation, and the residue is distilled. 40.3 g. of N-(β-hydroxy ethyl) nortropane of the boiling point 112–118° C./14 mm. Hg are obtained. The yield is 65.9% of the theoretical yield. Its hydrochloride melts at 158–160° C. after recrystallization from isopropanol.

(c) 31 g. of N-(β-hydroxy ethyl) nortropane are dissolved in 150 cc. of anhydrous benzene. 40 g. of thionylchloride in 50 cc. of benzene are slowly added drop by drop thereto, whereby the temperature is kept at about 10° C. The reaction mixture is then heated under reflux for 30 minutes. The precipitated compound is filtered off by suction and is washed with ether. 38.3 g. of N-(β-chloro ethyl) nortropane are obtained in the form of its hydrochloride. Melting point: 235–237° C. (from isopropanol). Yield: 91.1% of the theoretical yield.

(d) A mixture of 25 g. of benzilic acid and 6.1 g. of potassium hydroxide in 100 cc. of ethanol are heated under reflux for 30 minutes. The reaction mixture is evaporated to dryness. 21.1 g. of N-(β-chloro ethyl) nortropane hydrochloride are added thereto and the mixture is heated to 140° C. for 3 hours. Thereafter, 150 cc. of butanol are added. The mixture is heated under reflux for 5 hours. Precipitated sodium chloride is filtered off by suction while still hot and a small amount of ether is added to the filtrate. 31.4 g. of the benzilic acid ester of N-(β-hydroxy ethyl) nortropane precipitate in the form of its hydrochloride, melting at 181–183° C. on recrystallization from isopropanol. The yield is 78.3% of the theoretical yield.

EXAMPLE 4

*Benzilic Acid Ester of N-(β-Hydroxy Propyl) Norgranatane*

(a) 73 g. of acetone dicarboxylic acid, 37.5 g. of 1-amino propanol-(2), and 28 g. of sodium acetate trihydrate are dissolved in 1250 cc. of water; 200 cc. of a 25% aqueous glutardialdehyde solution are added thereto. The pH value of the mixture is adjusted to a pH between 3.0 and 4.0 by the addition of concentrated hydrochloric acid. The mixture is then allowed to stand at room temperature for 3 days. Thereafter, it is rendered alkaline by the addition of concentrated sodium hydroxide solution and is extracted with chloroform. The chloroform extract is dried over sodium sulfate and evaporated to dryness. The residue is distilled. 54.4 g. of N-(β-hydroxy propyl) norpseudopelletierine of the boiling point 130–135° C./0.3 mm. Hg are obtained. The yield is 55.2% of the theoretical yield. The compound solidifies and melts at 37–39° C. after recrystallization from petroleum ether. Its hydrochloride melts at 210° C. with decomposition, after recrystallization from ethanol.

(b) 98.6 g. of N-(β-hydroxy propyl) norpseudopelletierine, 80 cc. of hydrazine hydrate, 10 cc. of water, 84 g. of potassium hydroxide, and 500 cc. of triglycol are slowly heated to 240° C. while stirring. Water is added to the reaction mixture and the aqueous mixture is extracted with chloroform. The chloroform extract is washed with water, dried over sodium sulfate, and evaporated to dryness. The residue is distilled in a vacuum. 60.8 g. of N-(β-hydroxy propyl) norgranatane of the boiling point of 90–98° C./0.2 mm. Hg are obtained. The yield is 66.4% of the theoretical yield.

(c) N-(β-chloro propyl) norgranatane is obtained in the form of its hydrochloride of the melting point 194–196° C., on recrystallization from a mixture of dioxane and ethanol, by reacting N-(β-hydroxy propyl) norgranatane with thionylchloride according to the method described in Example 3(c). The yield is 72.7% of the theoretical yield.

(d) N-(β-hydroxypropyl) norgranatane and potassium benzilate are reacted according to the method described in Example 3(d) and yield the hydrochloride of [N-(β-hydroxy propyl) norgranatane] benzilic acid ester of the melting point 204–206° C. on recrystallization from isopropanol or from a mixture of dioxane and ethanol. The yield is 65.8% of the theoretical yield.

EXAMPLE 5

*Diphenyl Acetate of N-(β-Hydroxy Ethyl) Norgranatane*

16.9 g. of N-(β-hydroxy ethyl) norgranatane are heated under reflux with 23.1 g. of diphenyl acetic acid chloride and 100 cc. of pyridine for 8 hours. Thereafter, the pyridine is distilled off and the residue is caused to crystallize by triturating with ethyl acetate. 32.3 g. of the ester are obtained in the form of its hydrochloride. The yield is 80.7% of the theoretical yield. The compound melts at 148–150° C., after recrystallization from ethyl acetate with the addition of isopropanol.

EXAMPLE 6

*Phenyl Cyclohexyl Glycolic Acid Ester of N-(β-Hydroxy Ethyl) Norgranatane*

25 g. of phenyl cyclohexyl glycolic acid and 6 g. of potassium hydroxide are dissolved in 100 cc. of ethanol. The solution is heated under reflux for 30 minutes and is then evaporated to dryness. The resulting salt is heated with 22.3 of N-(β-chloro ethyl) norgranatane hydrochloride to 140° C. for 3 hours.

The completely solidified reaction product is heated under reflux in n-butanol for six more hours and the precipitated potassium chloride is filtered off by suction while still hot. The filtrate is allowed to cool and a small amount of ether is added thereto. Thereby, 22.4 g. of the ester are obtained in the form of its hydrochloride. The yield is 53.1% of the theoretical yield. The hydrochloride melts at 202–204° C., after recrystallization from n-butanol with the addition of ether.

EXAMPLE 7

*Phenyl Cyclohexyl Glycolic Acid Ester of N-(γ-Hydroxy Propyl) Norgranatane*

12.3 g. of N,N-trimethylene granatanium bromide obtained according to Example 2, Method C(a), and 11.7 g. of phenyl cyclohexyl glycolic acid are heated under reflux in 100 cc. of ethanol for 5 hours. The resulting solution is concentrated by evaporation. The residue solidifies to a vitreous mass. It is dissolved in acetone. Ether is added to the solution. Thereby, 13.3 g. of the ester precipitates as crystalline hydrobromide. The yield is 55.4% of the theoretical yield. On recrystallization from isopropanol, the salts melt at 205–207° C.

EXAMPLE 8

*p-Methyl Benzilic Acid Ester of N-(β-Hydroxy Ethyl) Norgranatane*

(a) A solution of p-methyl phenyl magnesium bromide is prepared from 43 g. of p-bromo toluene, 14 g. of ethyl bromide, and 8.7 g. of metallic magnesium in 300 cc. of ether. A solution of 66 g. of phenyl glyoxylic acid methyl ester ("Organic Syntheses" Coll. vol. I, p. 241) is added drop by drop thereto. The mixture is then heated under reflux for 5 hours. Thereafter, 50 cc. of water and such an amount of dilute hydrochloric acid are added as required in order to completely dissolve the precipitate. The ethereal solution is separated, washed with water, sodium bicarbonate solution, and again with water, dried over sodium sulfate and evaporated to dryness. On fractional distillation of the residue, there are obtained a low boiling fraction of about 20 g. and 45.5 g. of p-methyl benzilic acid methyl ester of the boiling point 160–175° C./0.2 mm. Hg. The ester solidifies and melts at 96–98° C. on recrystallization from petroleum ether. The yield amounts to 70.9% of the theoretical yield.

(b) 23.2 g. of N-(-β-hydroxy ethyl) norgranatane, 35 g. of p-methyl benzilic acid methyl ester, and 0.2 g. of metallic sodium are heated in a vacuum of 25 mm. Hg at 120° C. for 10 hours. 6 N hydrochloric acid and ether are then added to the mixture whereby an oily compound precipitates. This compound is obtained in crystalline form by the addition of a small amount of acetone and triturating the mixture. On filtering by suction, 34.6 g. of the p-methyl benzilic acid ester of N-(β-hydroxy ethyl) norgranatane are obtained in the form of its hydrochloride of the melting point 195–197° C. after recrystallization from isopropanol. The yield amounts to 58.6% of the theoretical yield.

EXAMPLE 9

*p-Chloro Benzilic Acid Ester of N-(β-Hydroxy Ethyl) Norgranatane*

(a) When using p-chloro bromo benzene, in place of p-bromo toluene, and otherwise proceeding as described in Example 8(a), the p-chloro benzilic acid methyl ester is obtained as an oily liquid of the boiling point 174–180° C./0.8 mm. Hg in a yield of 81.5% of the theoretical yield.

(b) 33.9 g. (0.2 mole) of N-(β-hydroxy ethyl) norgranatane, 55.3 g. (0.2 mole) of p-chloro benzilic acid methyl ester, and 0.3 g. of metallic sodium are heated to 140° C. in a vacuum of 15 mm. Hg for 8 hours. After cooling, 80 cc. of 6 N hydrochloric acid and 40 cc. of ether are added thereto and the mixture is stirred for 3 hours. The p-chloro benzilic acid ester of N-(β-hydroxy ethyl) norgranatane precipitates in the form of its crystalline hydrochloride. It is filtered off by suction. Yield: 21.1 g. corresponding to 25.4% of the theoretical yield. Melting point: 200–201° C. on recrystallization from ethanol.

EXAMPLE 10

*N-(β-Hydroxy Ethyl) Norgranatane Chloro Diphenyl Acetate*

12 g. of the hydrochloride of the benzilic acid ester of N-(β-hydroxy ethyl) norgranatane obtained according to Example 1 are dissolved in 400 cc. of carbon tetrachloride while heating. 10 cc. of thionylchloride are added slowly drop by drop to the resulting solution while boiling under reflux. Heating is continued for three more hours. Thereafter, carbon tetrachloride and excess thionylchloride are distilled off and the residue is recrystallized from acetic acid ethyl ester. 9.3 g. of the N-(β-hydroxy ethyl) norgranatane chloro diphenyl acetate are obtained in the form of its hydrochloride of the melting point 127–129° C. Yield: 74.2% of the theoretical yield. In place of benzilic acid, diphenyl acetic acid, phenyl cyclohexyl glycolic acid, p-methyl benzilic acid, and p-chloro benzilic acid and their reactive derivatives as used in the preceding examples, there may be employed equimolecular amounts of other suitable acids and their reactive derivatives such as p-bromo benzilic acid, p-ethoxy benzilic acid, p-ethyl mercapto benzilic acid, p-trifluoro methyl benzilic acid, di-(p-chloro phenyl) acetic acid, di-(p-methoxy phenyl) acetic acid, di-(p-chloro phenyl) glycolic acid, phenyl cyclopentyl glycolic acid, tolyl cyclohexyl glycolic acid. In place of p-substituted also o-substituted benzilic acids may be used. Thus, the o-methyl benzilic acid ester of N-(β-hydroxy ethyl) norgranatane was obtained; its hydrochloride melts at 197–199° C. The procedure is otherwise the same as described in the preceding examples.

It is understood that in Examples 4 to 10, the norgranatane starting materials may be replaced by the corresponding nortropane compounds.

In place of the hydrochloride or hydrobromide, there may be prepared other acid addition salts, such as the addition salts with pharmaceutically acceptable acids which do not adversely affect the therapeutic activity of the new compounds, for instance, with other inorganic acids such as sulfuric acid, phosphoric acid, and the like, or with organic acids, such as formic acid, acetic acid, malonic acid, succinic acid, maleic acid, citric acid, tartaric acid, malic acid, benzoic acid, salicylic acid, phthalic acid, isonicotinic acid, and others.

Quaternary ammonium compounds of the new esters are readily obtained by reaction with quarternizing agents such as alkyl or aralkyl halogenides, for instance, methyliodide, ethylbromide, benzylchloride, or with dialkyl sulfates, for instance, dimethyl sulfate, diethyl sulfate, with toluene sulfonic acid ethyl ester, and others.

Especially valuable compounds of high therapeutic activity are the following compounds:

The benzilic acid ester of N-(β-hydroxy ethyl) norgranatane according to Example 1;

The benzilic acid ester of N-(β-hydroxy ethyl) nortropane according to Example 3;

The phenyl cyclohexyl glycolic acid ester of N-(β-hydroxy ethyl) norgranatane according to Example 6;

The p-methyl benzilic acid ester of N-(β-hydroxy ethyl) norgranatane according to Example 8;

The p-chloro benzilic acid ester of N-(β-hydroxy ethyl) norgranatane according to Example 9; and The α-chloro diphenyl acetic acid ester of N-(β-hydroxy ethyl) norgranatane according to Example 10.

As stated hereinabove, the new compounds have noteworthy anticholinergic properties. They surpass, for instance, known anticholinergic benzilic acid esters in their central and peripheral anticholinergic activity and, in addition thereto, possess a specific central point of attack.

The peripheral anticholinergic activity of the new esters was determined by using the method of P. Pulewska "Arch. exp. Path. u. Pharmacol.," vol. 168, p. 307 (1932) and determining its mydriatic effect on mice.

Their central anticholinergic activity was determined according to the following test methods:

(a) *Inhibition of the "Tremorin" tremor.*—Tremorin (1,4-dipyrrolidino-2-butyne) causes a tremor which resembles to a certain degree the syndromes of Parkinsonism. This tremor is inhibited by the central effect of anticholinergic agents. Thus the degree of inhibition of the Tremorin tremor in mice can be regarded as an indication of a central anticholinergic activity. The method of G. M. Everett, "Nature" (London) vol. 177, page 1238 (1956) was used.

(b) *Diethyl p-nitrophenyl phosphate toxicity.*—The peripheral activity of the cholinesterase blocking agent O,O-diethyl-O-(p-nitro phenyl) phosphate ("Mintacol") is inhibited by pyridine-2-aldoxime-1-methyl iodide. Death of the animals on administration of "Mintacol" is a result of the pretreatment with pyridine-2-aldoxime-1-methyl iodide and thus is caused by central cholinergic effects. Death can be prevented by administration of centrally effective anticholinergic agents. W. Schaumann has described a testing method based on these facts in "Arch. exp. Path. u. Pharmacol.," vol. 239, page 96 (1960). According to said method, a lethal dose of "Mintacol" was administered to mice. At the same time the animals received pyridine-2-aldoxime-1-methyl iodide by subcutaneous injection. The effective dose by which the central "Mintacol" toxicity is reduced to 50% is designated as ED 50.

(c) *Inhibition of the catatony caused by thiopropazate.*—Thiopropazate, i.e. 2-chloro-10{γ-[4-(β-acetoxy ethyl)piperazinyl]propyl}phenothiazine, causes a flexibilitas cerea or catatony in rats which can be suppressed by administration of centrally effective anticholinergic agents. According to W. Schaumann and M. J. Kurbjuweit, "Arzneimittelforschung" vol. 11, page 343 (1961) or, respectively, M. Taeschler et al., "Psychiatria et Neurologia" vol. 139, page 85 (1960), rats first received thiopropazate. Thereafter, the dose of the compound to be tested, which prevents occurrence of catatony in 50% of the animals, is determined.

The thus experimentally determined absolute values of the peripheral and the central anti-cholinergic activity permit calculation of an index for the central specificity of the tested compounds. For this purpose the ED 50 with regard to mydriasis in mice is divided by the ED 50 of the Tremorin or, respectively, "Mintacol" test in mice and the resulting quotient is multiplied by 100.

The thiopropazate test is carried out additionally on rats and, therefore, can be compared only to a limited extent with the results of the other test methods.

The following table represents the pharmacological test results obtained with various esters according to the present invention in comparison with the recently introduced anticholinergic agent, the benzilic acid ester of N-(β-hydroxy ethyl) piperidine.

The following compounds were tested under the numbers given:

2263: Benzilic acid ester of N-(β-hydroxy ethyl) piperidine (known compound);
2367: Benzilic acid ester of N-(β-hydroxy ethyl) nortropane;
2240: Benzilic acid ester of N-(β-hydroxy ethyl) norgranatane;
2405: α-Chloro diphenyl acetic acid ester of N-(β-hydroxy ethyl) norgranatane;
2317: Phenyl cyclohexyl glycolic acid ester of N-(β-hydroxy ethyl) norgranatane;
2392: p-Methyl benzilic acid ester of N-(β-hydroxy ethyl) norgranatane;
2393: p-Chloro benzilic acid ester of N-(β-hydroxy ethyl) norgranatane.

| Compound No. | Toxicity, mg./kg. | Peripheral activity, Mydriasis, mg./kg. subcutan. | Central activity | | | | Central specificity | | Thiopropazate catatony, mg./kg. subcutan. | Therapeutic Index |
| --- | --- | --- | --- | --- | --- | --- | --- | --- | --- | --- |
| | | | Mintacol toxicity, mg./kg. subcutan. | Therapeutic Index | Tremorin tremor, mg./kg. subcutan. | Therapeutic Index | ED 50 mydriasis × 100 / ED 50 Mintacol | ED 50 mydriasis × 100 / ED 50 Tremorin tremor | | |
| 2263 | 105 | 20 | 14.00 | 7.5 | 10 | 10.5 | 145 | 200 | 7.6 | 13.5 |
| 2367 | 300 | 20.3 | 4.00 | 75 | 23 | 13 | 507 | 88 | 9.5 | 31.5 |
| 2240 | 335 | 7.2 | 1.95 | 172 | 2.8 | 120 | 370 | 257 | 3.8 | 88 |
| 2405 | 640 | 7.5 | 1.60 | 400 | 4.4 | 145 | 470 | 170 | 9.8 | 65 |
| 2317 | 860 | 1.0 | 1.8 | 480 | 0.98 | 880 | 55 | 102 | 1.3 | 660 |
| 2392 | 115 | 27.0 | 3.2 | 36 | 9.20 | 12.5 | 840 | 294 | 16.0 | 7.2 |
| 2393 | 680 | 31.0 | 7.0 | 97 | 4.60 | 148 | 440 | 675 | >80 | |

This table shows that the compounds according to the present invention are far more effective than the known compound No. 2263 in the "Mintacol" test not only with respect to their absolute cholinergic activity but also with respect to their central specificity index. Their therapeutic index is also much better. In general, the Tremorin tremor test gave results similar to the "Mintacol" test. All the compounds had a substantially better therapeutic index than No. 2263. The compounds 2240 and 2317 are especially effective centrally acting anticholinergic agents when tested according to the thiopropazate catatony test.

It is evident that the compounds according to the present invention possess pronounced anticholinergic properties and a low toxicity whereby the peripheral anticholinergic activity is substantially repressed in favor of a pronounced central acticholinergic activity.

The new esters are effective therapeutic agents for the treatment of disorders of the central nervous system. More specifically, these novel compounds have utility as tranquilizers, anticholinergics and anti-Parkinsonism drugs. In particular, they may be used as premedication by the anaesthesiologist.

The new esters, their acid addition salts, and their quaternary ammonium compounds may be administered orally, parenterally, or as suppositories. The preferred mode of administration is oral administration in the form of liquid or solid preparations, such as tablets, pills, dragees, powders, capsules, solutions, emulsions, suspensions, dispersions, or in any other suitable form.

In the case of powders, fine uniform dispersion of the active compounds together with a usual carrier throughout said powder is of importance. Such a fine dispersion can be achieved by intimately mixing and milling the active compound, for instance, in a ball mill with a solid pulverulent extending agent to the desired degree of fineness or by impregnating the already milled, finely powdered, solid carrier with the active compound in water or with a solution thereof in a suitable organic solvent and then removing the water or solvent.

A fine dispersion of the active compound in water, sirup and the like can also be brought about by emulsifying said compound with the acid of a dispersing or emulsifying agent.

When preparing tablets, pills, powders, and the like solid preparations, the commonly used carriers and diluting agents, binders, and the like tableting adjuvants are employed, such as sugar, lactose, starch, pectin, bolus alba, stearic acid, magnesium stearate, and as binders gelatin, gum arabic, methyl cellulose, carboxy ethyl cellulose, yeast extract, agar, tragacanth, and others. It is, of course, understood that any of the tableting materials conventionally used in pharmaceutical practice can be employed provided there is no incompatibility with the active compound.

Injectable solutions may also be prepared.

Of course, many changes and variations in the starting materials and reactants, in the solvents used, in the reaction conditions, temperature, pH-value of the reaction mixture, duration, in the methods of working up, isolating, and purifying the reaction products, and the like may be made by those skilled in the art in accordance with the principles set forth herein and in the claims annexed hereto.

We claim:

1. The benzilic acid ester of N-(β-hydroxy ethyl) norgranatane.
2. The benzilic acid ester of N-(β-hydroxy ethyl) nortropane.
3. The phenyl cyclohexyl glycolic acid ester of N-(β-hydroxy ethyl) norgranatane.
4. The p-methyl benzilic acid ester of N-(β-hydroxy ethyl) norgranatane.
5. The p-chloro benzilic acid ester of N-(β-hydroxy ethyl) norgranatane.
6. The α-chloro diphenyl acetic acid ester of N-(β-hydroxy ethyl) norgranatane.
7. An ester compound selected from the group consisting of an ester of the formula

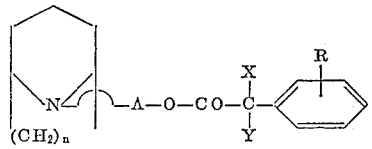

wherein

R is a member selected from the group consisting of hydrogen, chlorine, lower alkyl, lower alkoxy, lower alkyl mercapto, and trifluoro methyl;

Y is a member selected from the group consisting of phenyl, cycloalkyl, and phenyl and cycloalkyl substituted by a member selected from the group consisting of halogen, lower alkyl, lower alkoxy, lower alkyl mercapto, and trifluoro methyl;

X is a member selected from the group consisting of hydrogen, hydroxyl, and chlorine;

A is lower alkylene having two to three carbon atoms; and $n$ indicates the numerals 2 and 3, and its pharmaceutically acceptable acid addition salts.

No referenecs cited.